United States Patent
Kawamura

(10) Patent No.: US 6,168,547 B1
(45) Date of Patent: Jan. 2, 2001

(54) LINE PRESSURE CONTROL DEVICE FOR AUTOMATIC TRANSMISSION

(75) Inventor: Yasutaka Kawamura, Kanagawa (JP)

(73) Assignee: Nissan Motor Co., Ltd., Yokohama (JP)

(*) Notice: Under 35 U.S.C. 154(b), the term of this patent shall be extended for 0 days.

(21) Appl. No.: 09/357,768

(22) Filed: Jul. 21, 1999

(30) Foreign Application Priority Data

Jul. 24, 1998 (JP) .................................................. 10-209826
Jul. 28, 1998 (JP) .................................................. 10-212662

(51) Int. Cl.$^7$ .................................................. F16H 61/06
(52) U.S. Cl. .......................... 477/156; 477/158; 477/160
(58) Field of Search ................................ 477/156, 158, 477/160, 159, 161

(56) References Cited

U.S. PATENT DOCUMENTS 4,191,072 * 3/1980 Ehrlinger et al. ................. 475/125 X
5,085,107 * 2/1992 Tatara ................................. 477/48 X
5,749,804 5/1998 Toukura ................................. 477/47

FOREIGN PATENT DOCUMENTS

19934682 * 2/2000 (DE) .
8-28646 2/1996 (JP) .
9-112671 5/1997 (JP) .

* cited by examiner

Primary Examiner—Khoi Q. Ta
(74) Attorney, Agent, or Firm—Foley & Lardner

(57) ABSTRACT

A controller (61) for a line pressure control device of a transmission (200) compares a CVT pressure $P_{CVT}$ and a clutch pressure $P_{LUB}$ when the rotation speed of an engine (100) is low and sets the higher of the two as a target line pressure $P_L$. When the rotation speed of an engine (100) is high, the CVT pressure $P_{CVT}$, the clutch pressure $P_{LUB}$ and a lubrication pressure $P_{LUB}$ are compared, and the highest of the three is set as the target line pressure $P_L$. Thus it is possible to reduce pump noise as well as satisfy oil pressure requirements in the transmission (200) by switching the method of setting a line pressure in response to the rotation speed of the engine (100).

6 Claims, 10 Drawing Sheets

LINE PRESSURE CONTROL DEVICE FOR AUTOMATIC TRANSMISSION

FIELD OF THE INVENTION

The present invention relates to a line pressure control device for an automatic transmission.

BACKGROUND OF THE INVENTION

An automatic transmission for a vehicle is provided with a line pressure control device which comprises an oil pump and a pressure regulator valve. The line pressure control device controls the line pressure supplied to a speed ratio varying mechanism which varies a speed ratio and a clutch mechanism which switches a direction of transmission of the drive force. Tokkai Hei 8-28646 published by the Japanese Patent Office in 1996 discloses a line pressure control device which raises a line pressure in response to torque input into the transmission.

SUMMARY OF THE INVENTION

However, when a line pressure is set according to the input torque, although it is possible to set a high line pressure which increases together with increases in input torque of the transmission, that is to say, as transmitted torque increases, noise in the oil pump increases as line pressure rises. On the other hand, when a low line pressure is set, although it is possible to reduce pump noise, it is difficult to satisfy oil pressure requirements of the transmission which increase with increases in input torque.

Therefore it is difficult to achieve both oil pressure requirements in the transmission and reductions in pump noise when a line pressure is set only in response to input torque.

It is therefore an object of this invention to satisfy required oil pressures in the transmission while reducing pump noise.

In order to achieve the above object, this invention provides a line pressure control device for an automatic transmission, the transmission comprising a speed ratio varying mechanism and a clutch mechanism for transmitting rotation of an engine to an output shaft. The line pressure control device comprises an oil pressure circuit for varying a line pressure supplied to the speed ratio varying mechanism and the clutch mechanism, a sensor for detecting a rotation speed of the engine.

The line pressure control device further comprises a microprocessor programmed to calculate a lubrication pressure for lubrication of the speed ratio varying mechanism and a clutch pressure for an operation of the clutch mechanism based on an operating condition of the transmission, determine whether the rotation speed of the engine is higher or lower than a fixed threshold, set a target line pressure to the higher of the lubrication pressure and the clutch pressure as a target line pressure, when the rotation speed of the engine is higher than the threshold, set the clutch pressure as the target line pressure when the rotation speed of the engine is lower than the threshold and control the oil pressure circuit so that the line pressure equals the target line pressure.

The details as well as other features and advantages of this invention are set forth in the remainder of the specification and are shown in the accompanying drawings.

DESCRIPTION OF THE PREFEFFED EMBODIMENTS

Figure 1:
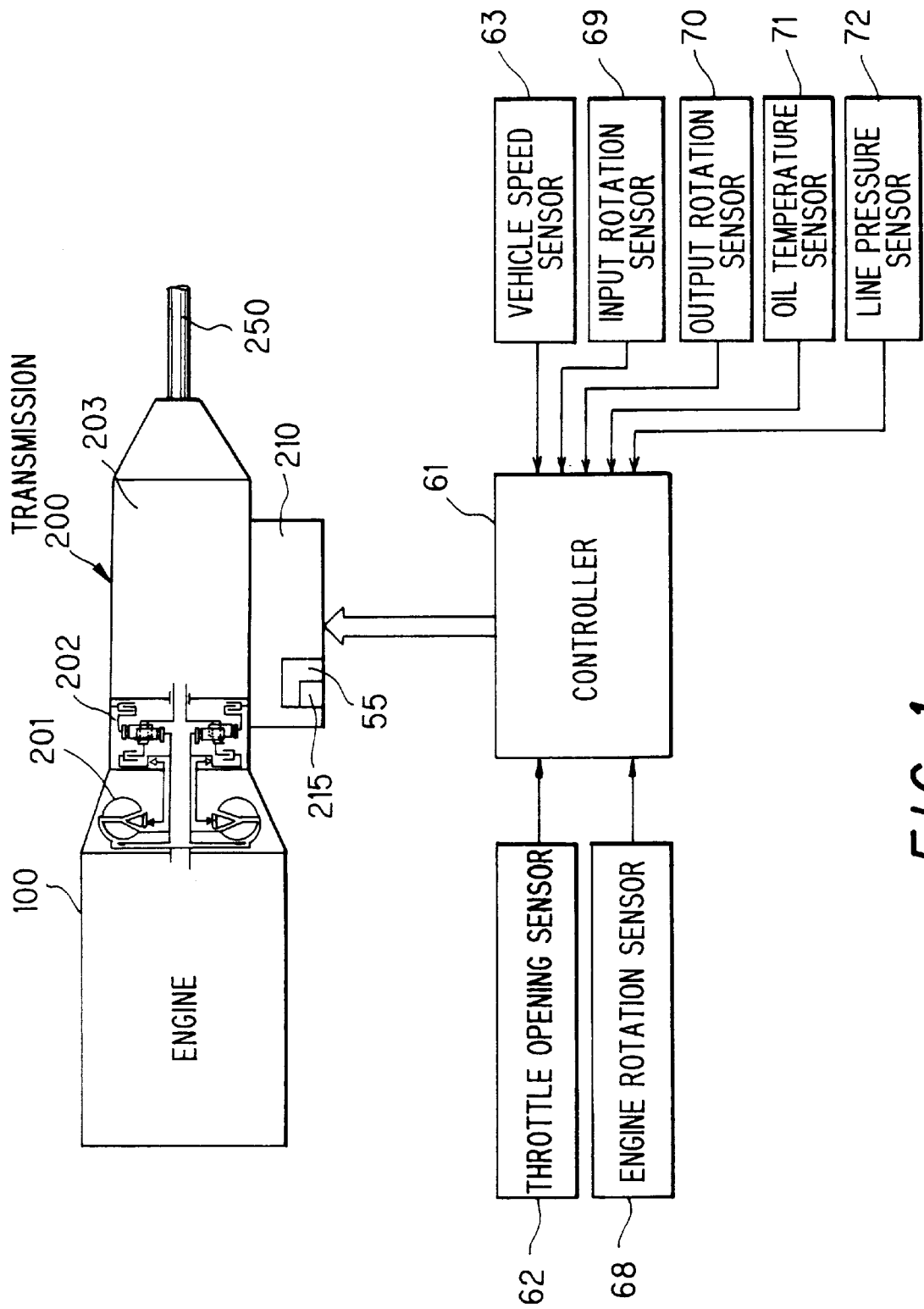
FIG. 1 is a schematic diagram of an automatic transmission provided with a line pressure control device according to the present invention.

Referring to FIG. 1 of the drawings, a line pressure control device for a toroidal continuously variable transmission (CVT) 200 is provided with an oil pressure circuit 210 and a controller 61.

The transmission 200 has a torque converter 201, a clutch mechanism 202, a speed ratio varying mechanism 203 and an output shaft 250. The clutch mechanism 202 is provided with a forward clutch and a reverse clutch and switches the direction of transmission of the drive force.

The oil pressure circuit 210 has control valves and actuators, not shown, and a line pressure solenoid 215 which controls line pressure.

Figure 2:
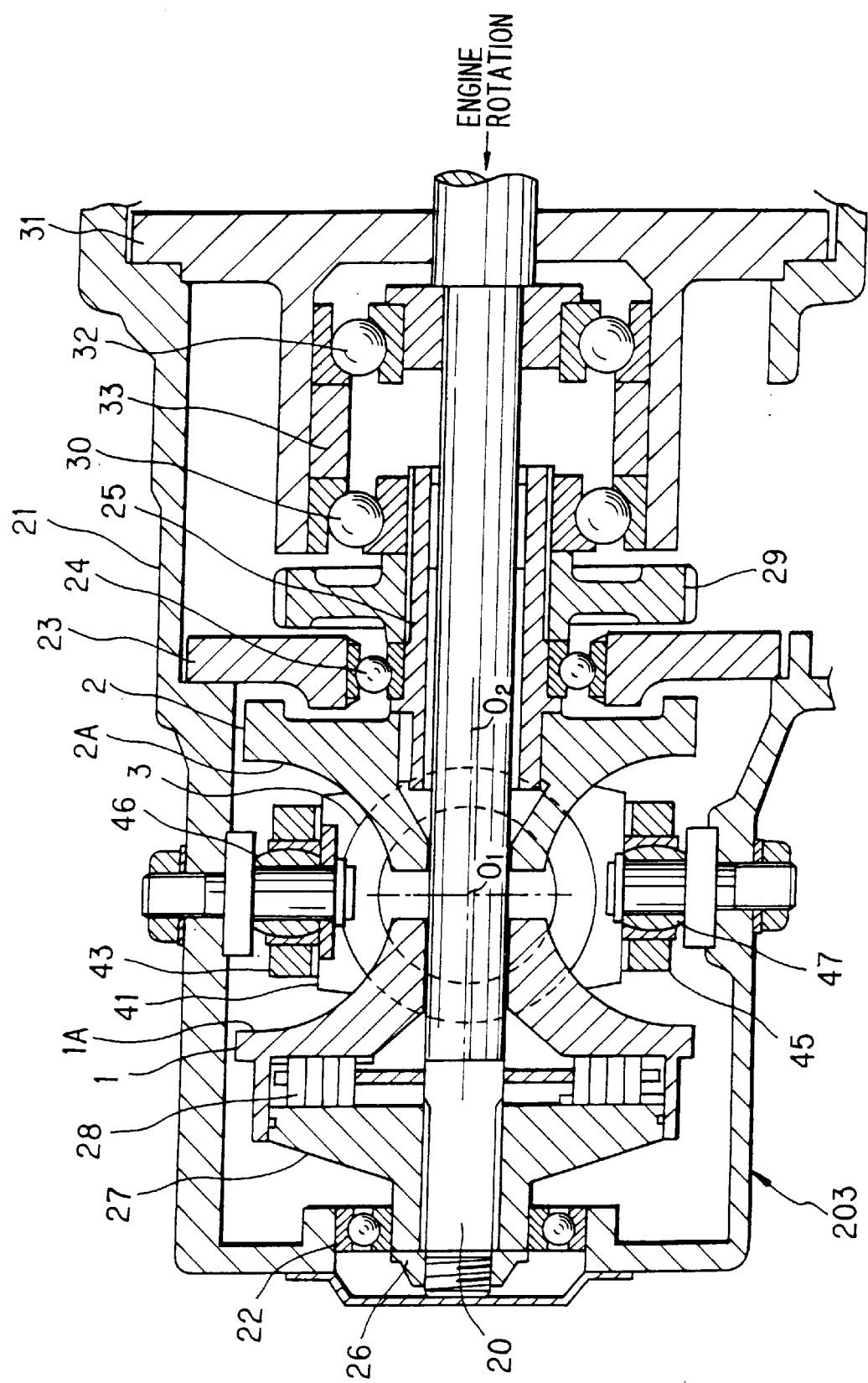
FIG. 2 is a longitudinal cross sectional view of a speed ratio varying mechanism of the transmission.

FIG. 2 shows the longitudinal cross section of the speed ratio varying mechanism 203. The clutch mechanism 202 is provided on the right side of FIG. 2. The torque converter 201 is provided further to the right. The rotations of the engine 100 are transmitted to the speed ratio varying mechanism 203 through the torque converter 201 and the clutch mechanism 202.

The speed ratio varying mechanism 203 is provided with an input shaft 20 into which the rotations of the engine 100 are input. An end of the input shaft 20 is supported by a bearing 22 in a transmission case 21. The central section of the input shaft 20 passes through a hollow output shaft 25 which is supported by a bearing 24 on a central wall 23 of the transmission case 21. Another end of the input shaft 20 is supported by an angular bearing 32 in a lid 31 of the transmission case 21.

Input and output disks 1, 2 are respectively supported free to rotate on the input shaft 20. The input and output disks 1, 2 are disposed so that the toroidal curved faces 1A, 2A are opposed. A pair of power rollers 3 is gripped between the toroidal curved faces 1A, 2A.

A cam disk 27 is connected to the input shaft 20 by splines. The cam disk 27 is fixed to the input shaft 20 by a loading nut 26. Loading cams 28 are provided between the input disk 1 and the cam disk 27. The rotation of the cam disk 27 are transmitted to the input disk 1 through the loading cams 28.

The rotation of the input disk 1 is transmitted to the output disk 2 through the power rollers 3. When the cam disk 27 is rotated, a thrust load is generated by the loading cams 28 which is proportional to the transmitted torque. This thrust load locks the relative rotation of the cam disk 27 and input disk 1 while providing a gripping force of the power rollers 3 between the input and output disks 1,2.

Due to this gripping force, the lubricant oil between the power rollers 3 and the input and output disks 1, 2 becomes solidified and transmission of drive force is performed by a shearing force working on the solidified layer of oil. In order to smoothly transmit the rotation between the disks 1 and 2, it is necessary to supply sufficient lubricating oil with the power rollers 3. The supply of lubricating oil is controlled by the line pressure control device to be discussed later.

The output disk 2 is spline jointed to the output shaft 25. An output gear 29 is spline jointed to rotate together with the output shaft 25.

The output shaft 25 is supported by an angular bearing 30 on the lid 31 of the transmission case 21

The angular bearings 30, 32 are spaced by a spacer 33. Furthermore the bearings 30, 32 are gripped in the axial direction by an end face of output gear 29 and a larger diameter part of the input shaft 20 such that the bearings 30, 32 are prevented from separating from one another. As a result, the thrust load operating on the input and output disks 1, 2 only operates on the spacer 33 and does not operate on the transmission case 21.

Figure 3:
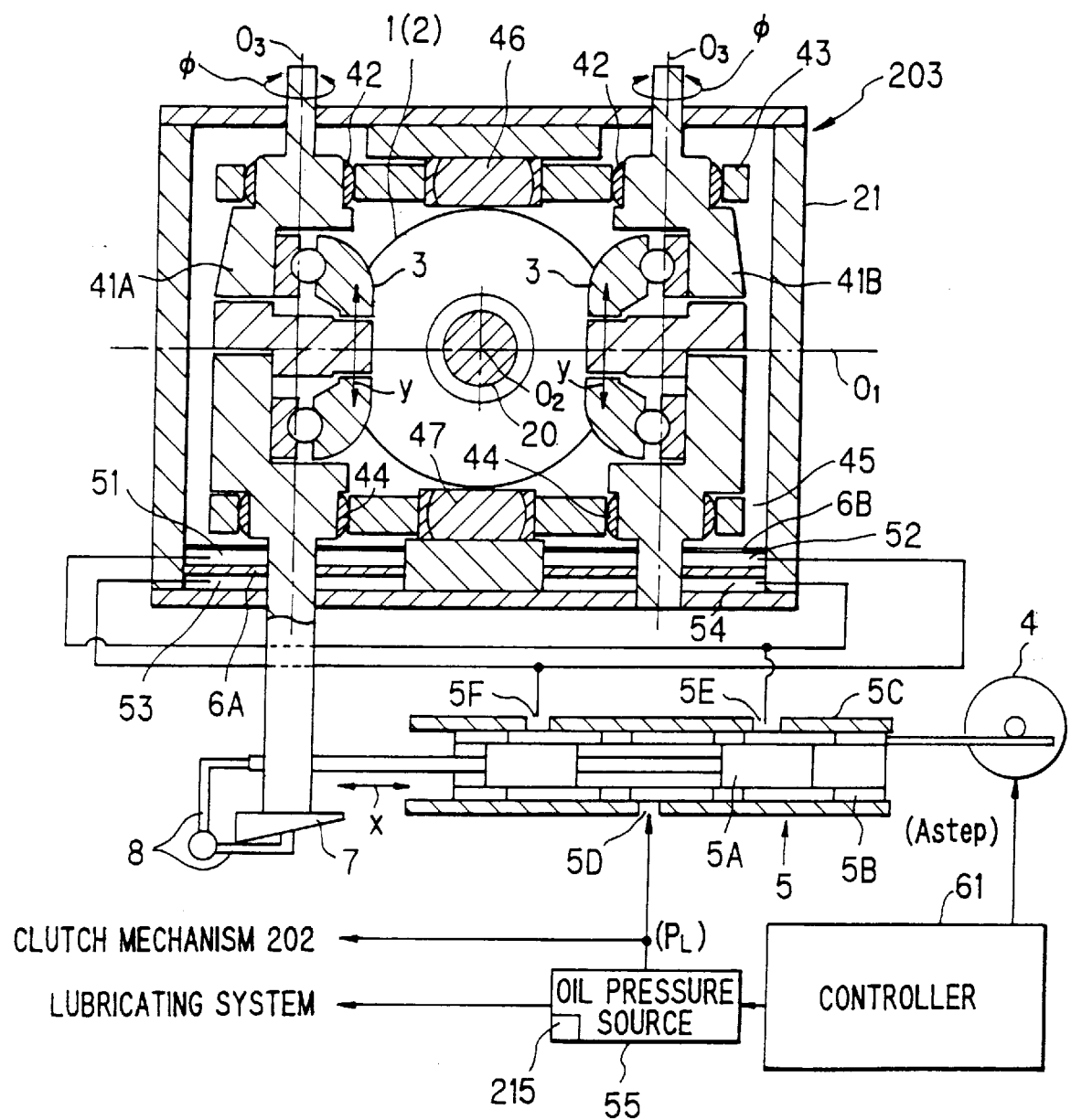
FIG. 3 is a cross sectional view of the transmission.

The power rollers 3 are supported free to rotate on trunnions 41A, 41B as shown in FIG. 3. Upper parts of the trunnions 41A, 41B are connected to an upper link 43 by spherical joints 42 and lower parts of the trunnions 41A, 41B are connected to a lower link 45 by spherical joints 44.

The centers of the upper link 43 and lower link 45 are connected to freely slide on the transmission case 21 by the spherical joints 46, 47. The upper and lower links 43, 45 can displace the trunnions 41A, 41B vertically in synchrony in the opposite directions. The transmission 200 varies speed ratio by displacing the trunnions 41A, 41B vertically in synchrony in mutually opposite directions.

Pistons 6A, 6B fixed to the lower part of the trunnion 41A, 41B to drive the trunnions 41A, 41B individually in the vertical direction. Upper chambers 51, 52 and lower chambers 53, 54 are defined respectively on both sides of the pistons 6A, 6B. The supply of oil pressure to the pistons 6A, 6B is controlled by a control valve 5.

The control valve 5 is provided with a spool 5A and a sleeve 5B. The spool 5A slides in the sleeve 5B and the sleeve 5B slides in a valve case 5C.

The control valve 5 is provided with ports 5D, SE and SF. The port 5D is connected to the oil pressure source 55. The port SE is connected to the piston chambers 51, 54 and the port 5F is connected to the piston chambers 52, 53.

The spool SA is connected to a lever 8 which contacts with a precess cam 7 fitted to the lower end of the trunnion 41A. The sleeve 5B is driven through a rack and pinion by a step motor 4.

A speed ratio command value Astep which depends on a target speed ratio is output from the controller 61 to the step motor 4. When the step motor 4 is driven, the sleeve 5B displaces in an axial direction through the rack and pinion. When the sleeve 5B displaces from a neutral position with respect to the spool 5A to a position such as that for example in FIG. 3, the line pressure from the pressure source 55 is supplied to the chambers 52, 53 and the other chambers 51, 54 are drained. In contrast, when the sleeve 5B displaces in the opposite direction from the neutral position with respect to the spool 5A, the line pressure from the oil pressure source 55 is supplied to the chambers 51, 54 and the other chambers 52, 53 are drained. The pistons 6A, 6B which receive the line pressure displace the trunnions 41A, 41B vertically in mutually opposite directions.

As a result, the rotational axis $O_1$ of the power rollers 3 is displaced by a quantity y from a position which intersects with the rotational axis $O_2$ of the input and output disks 1, 2. A swinging force is applied on the power rollers 3 from the input and output disks 1, 2 due to the quantity y. As a result, the power rollers 3 gyrate through an angle $\Phi$ on the periphery of the rotational axis $O_3$ and speed ratio is changed.

The gyration angle $\Phi$ and the displacement y in the vertical direction of the power rollers is fed back mechanically to the spool 5A through the precess cam 7 and the lever 8 as a displacement x in the axial direction of the spool 5A.

When the target speed ratio is achieved, the spool 5A returns to a neutral position with respect to the sleeve 5B due to the mechanical feedback. At the same time, the power rollers 3 return to the position in which rotational axis $O_1$ intersects with the rotational axis $O_2$ of the input and output disks 1, 2 and the achieved speed ratio is maintained.

The oil pressure source 55 is provided with an oil pump, a pressure regulator valve, and the line pressure solenoid 215 and is provided in the oil pressure circuit 210 shown in FIG. 1.

The controller 61 sets the line pressure from the oil pressure source 55 on the basis of a CVT pressure $P_{CVT}$ which drives the power rollers 3 through the pistons 6A, 6B when the speed ratio command value Astep is changed, a clutch pressure PCLU which drives the forward and reverse clutch of the clutch mechanism 202 and a lubrication pressure $P_{LUB}$ for lubrication of the power rollers 3 and the disks 1,2. The line pressure is varied according to the duty ratio of the line pressure solenoid 215.

A controller 61 controls the line pressure solenoid 215 and the step motor 4. As shown in FIG. 1, signals from a throttle opening sensor 62, a vehicle speed sensor 63 and an engine rotation speed sensor 68 are input into the controller 61. Furthermore signals from an input rotation speed sensor 69 which detects a rotation speed of the input disk 1, an output rotation speed sensor 70 which detects a rotation speed of the output disk 2, an oil temperature sensor 71 which detects an oil temperature of the transmission 200 and a signal from a line pressure sensor 72 which detects the line pressure are input into the controller 61. The line pressure sensor 72 detects a line pressure from the internal signal of the controller 61.

The controller 61 comprises an input circuit, a central processing unit (CPU), a random access memory (RAM), a read only memory (ROM) and an output circuit. The input circuit A/D converts signals from the sensors. The speed ratio control program and the line pressure control program executed by the CPU are stored in the ROM or the RAM. The calculation result is stored in the RAM. The output circuit outputs a speed ratio command value Astep to the step motor 4 and drives the line pressure solenoid 215 at a duty ratio which corresponds to a target line pressure $P_L$.

The controller 61 calculates the speed ratio command value Astep which depends on the target speed ratio by executing the speed ratio control program not shown based on the above signals. The result is output to the step motor 4.

Figure 4:
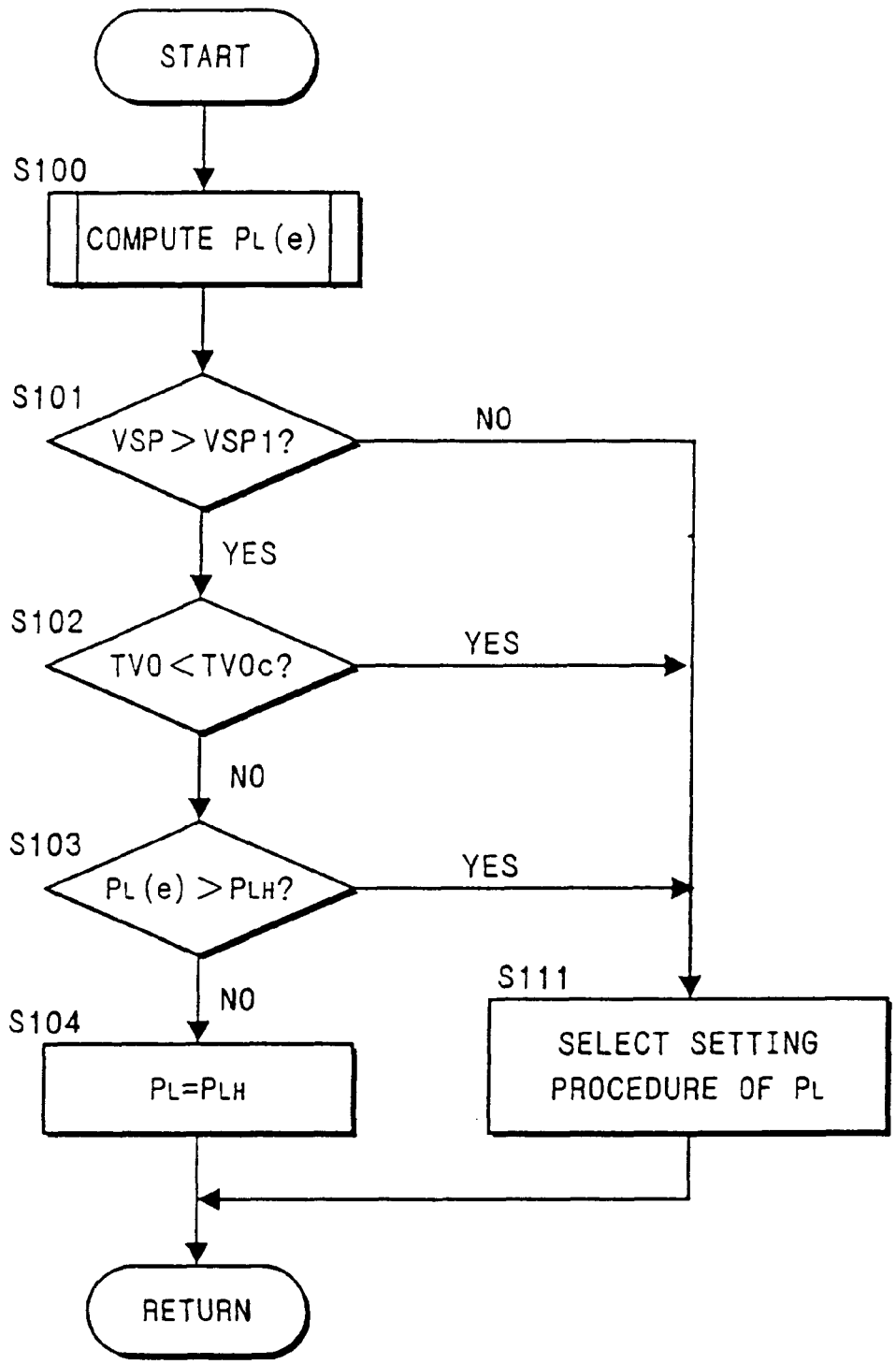
FIG. 4 is a flowchart for describing a process of setting a target line pressure performed by a controller of the line pressure control device.
Figure 5:
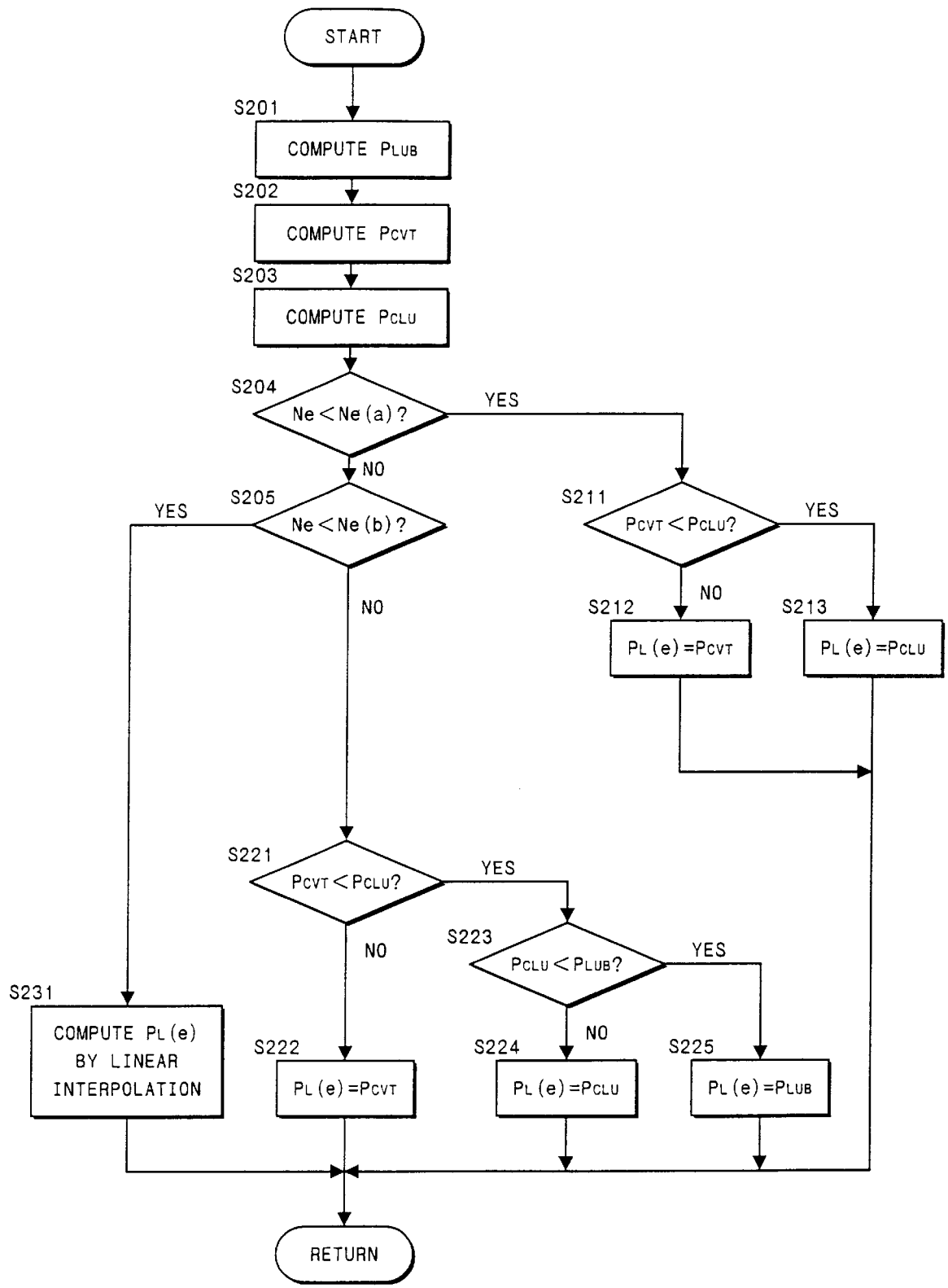
FIG. 5 is a flowchart for describing a process of calculating a required oil pressure performed by the controller.

The controller 61 sets the target line pressure $P_L$ by executing the program shown in FIG. 4 and FIG. 5 and drives the line pressure solenoid 25 at a duty ratio which corresponds to the target line pressure $P_L$.

With reference to FIG. 4, the controller 61 calculates a required pressure $P_L(e)$ for the transmission 200 in a step S100.

Figure 6:
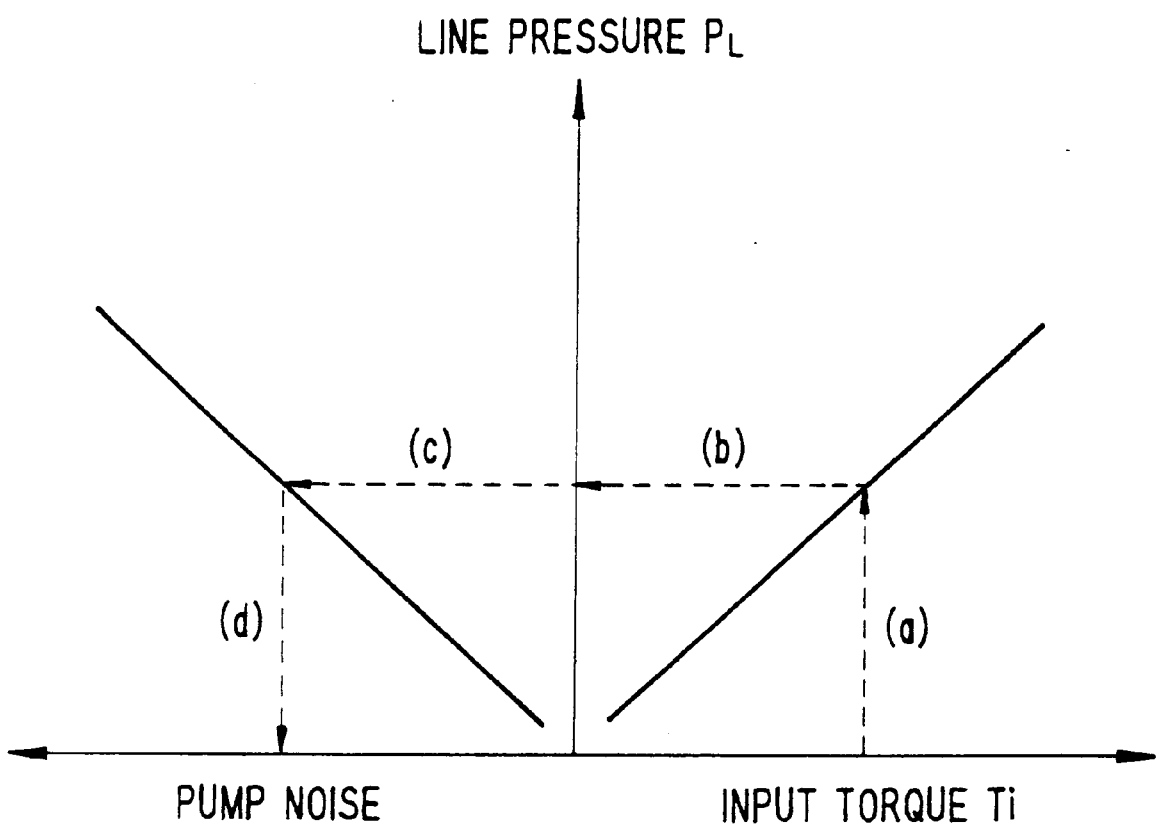
FIG. 6 is a figure showing the relationship between the input torque, line pressure and pump noise of the transmission.
Figure 7:
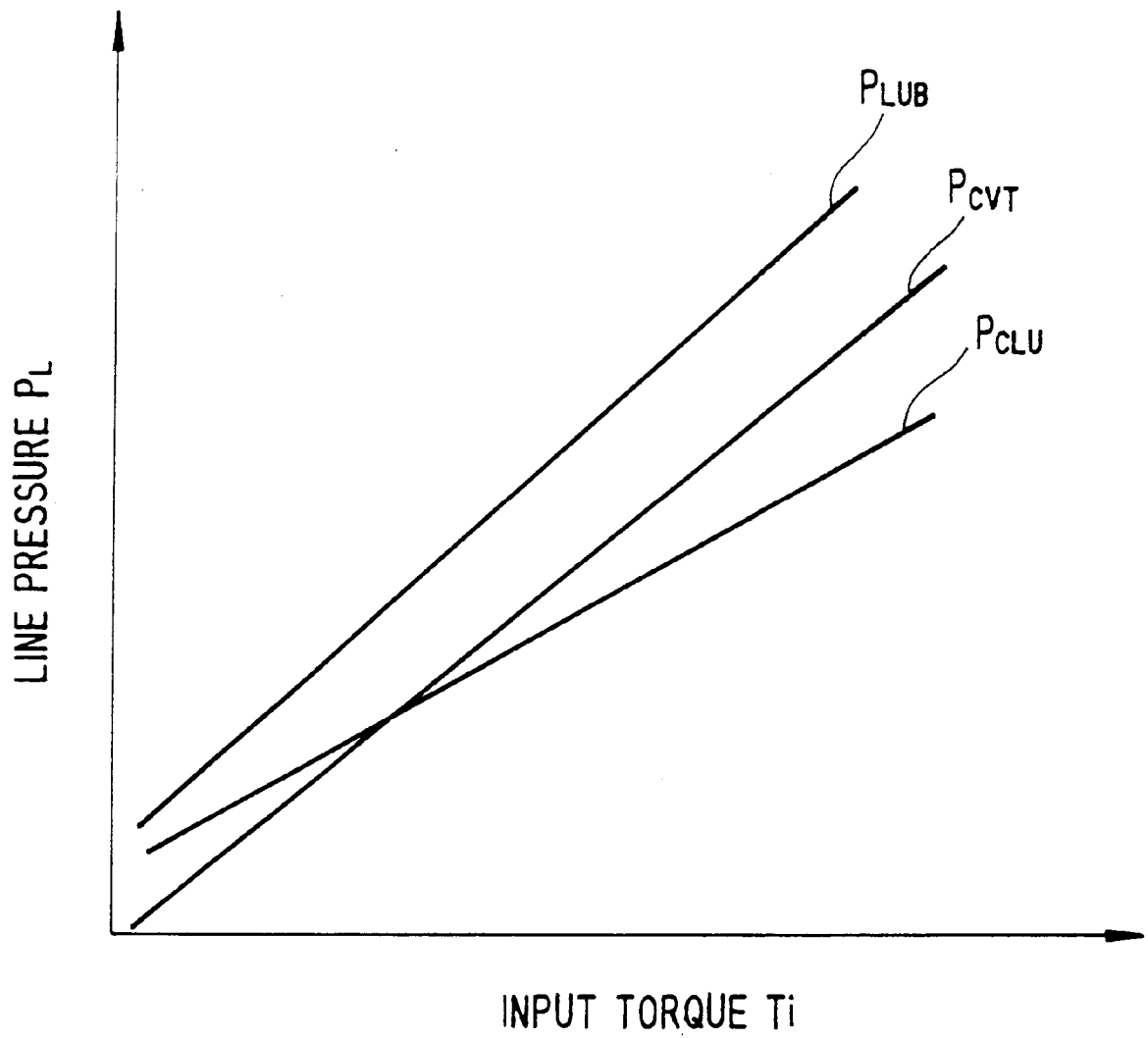
FIG. 7 is a figure showing the relationship between the required oil pressure and input torque of the transmission.

The CVT pressure $P_{CVT}$, the clutch pressure $P_{CLU}$ and the lubrication pressure $P_{LUB}$ are determined on the basis of the input torque of the transmission 200 as shown in FIG. 7. The relationship between the input torque, line pressure and oil pump noise is as shown in FIG. 6.

If the line pressure is set in response to the input torque, it is possible to set a higher line pressure at higher input torques ((a) to (b) in FIG. 6). However the pump noise increases as the line pressure becomes high ((c) to (d) in FIG. 6). Conversely, it is possible to reduce the pump noise by lower line pressure settings. However as shown in FIG. 7, it is not possible to provide required pressure for the transmission 200 which increases in response to increases in input torque.

In order to achieve both a reduction in oil pump noise and achieve oil pressure requirements, the required pressure $P_L(e)$ is calculated as shown below.

FIG. 5 shows a subroutine carried out in the step S100.

Firstly, in the steps S201–S203, the lubrication pressure $P_{LUB}$, the CVT pressure $P_{CVT}$ and the clutch pressure $P_{CLU}$ are calculated on the basis of the input torque Ti of the transmission 200.

The lubrication pressure $P_{LUB}$ is calculated from equation (1)

$$P_{LUB} = Ti \times K_1 + K_2 \quad (1)$$

wherein Ti=input torque $K_1$, $K_2$=constants

The input torque Ti may be calculated from firstly calculating an output torque of the engine 100 from the throttle opening TVO and engine rotation speed Ne by referring to a fixed map and then multiplying this value with the torque ratio t of the torque converter 201.

The CVT pressure PCVT may calculated from equation (2)

$$P_{CVT} = Ti \times K_3 \quad (2)$$

wherein Ti=input torque $K_3$=constant corresponding to speed ratio

The clutch pressure PCLU may be calculated from equation (3)

$$P_{CLU} = Ti \times K_4 + K_5 \quad (3)$$

wherein Ti=input torque $K_4$, $K_5$=constants

The calculated values $P_{LUB}$, $P_{CVT}$ and $P_{CLU}$ are stored in the RAM of the controller 61.

Next in a step S204, it is determined whether or not the engine rotation speed Ne is lower than a threshold Ne(a). If it is lower than the threshold Ne(a), the subroutine proceeds to a step S211. The threshold Ne(a) is set to 2000 rpm for example.

In the step S211, it is determined whether or not the clutch pressure $P_{CLU}$ is greater than the CVT pressure $P_{CVT}$. If the CVT pressure $P_{CVT}$ is greater than the clutch pressure $P_{CLU}$, the subroutine proceeds to a step S212, and $P_{CVT}$ is set as the required pressure $P_L(e)$. On the other hand, if the clutch pressure $P_{CLU}$ is greater than the CVT pressure $P_{CVT}$, the subroutine proceeds to a step S213 and $P_{CLU}$ is set as the required pressure $P_L(e)$.

When the engine rotation speed Ne is greater than the threshold rotation Ne(a), the subroutine proceeds to a step S205 wherein it is determined whether or not the engine rotation speed Ne is smaller than another threshold Ne(b) which is larger than the threshold Ne(a). The other threshold Ne(b) is set to 2400 rpm for example.

If the engine rotation speed Ne is smaller than the other threshold Ne(b), that is to say, that the engine speed Ne is between Ne(a) and Ne(b), the subroutine proceeds to a step S231. If the engine rotation speed Ne is greater than the other threshold Ne(b), the subroutine proceeds to a step S221.

In the step S221, it is determined whether the clutch pressure $P_{CLU}$ is greater than the CVT pressure $P_{CVT}$. If the CVT pressure $P_{CVT}$ is greater than the clutch pressure $P_{CLU}$, the subroutine proceeds to a step S222 and $P_{CVT}$ is set as the required pressure $P_L(e)$.

If the clutch pressure $P_{CLU}$ is greater than the CVT pressure $P_{CVT}$, the subroutine proceeds to a step S223 and it is determined whether or not lubrication pressure $P_{LUB}$ is greater than the clutch pressure $P_{CLU}$. If the clutch pressure $P_{CLU}$ is greater than the lubrication pressure $P_{LUB}$, the subroutine proceeds to a step S224 and $P_{CLU}$ is set as the required pressure $P_L(e)$. If the lubrication pressure $P_{LUB}$ is greater than the clutch pressure $P_{CLU}$, the subroutine proceeds to a step S225 and $P_{LUB}$ is set as the required pressure $P_L(e)$.

When the engine rotation speed Ne is greater than the threshold Ne(b), as it is possible that the values for CVT pressure $P_{CVT}$ and clutch pressure $P_{CLU}$ will be higher than the lubrication pressure $P_{LUB}$, the required pressure $P_L(e)$ is calculated considering the CVT pressure $P_{CVT}$ and clutch pressure $P_{CLU}$.

In the step S231, the required pressure $P_L(e)$ is calculated from linear interpolation.

$$P_L(e) = Pa + (Pb - Pa) \times (Ne - Ne(a))/(Ne(b) - Ne(a)) \quad (4)$$

wherein

Pa=the greater of $P_{CVT}$ and $P_{CLU}$

Pb=the greatest of $P_{CVT}$, $P_{CLU}$ and $P_{LUB}$

Figure 8:
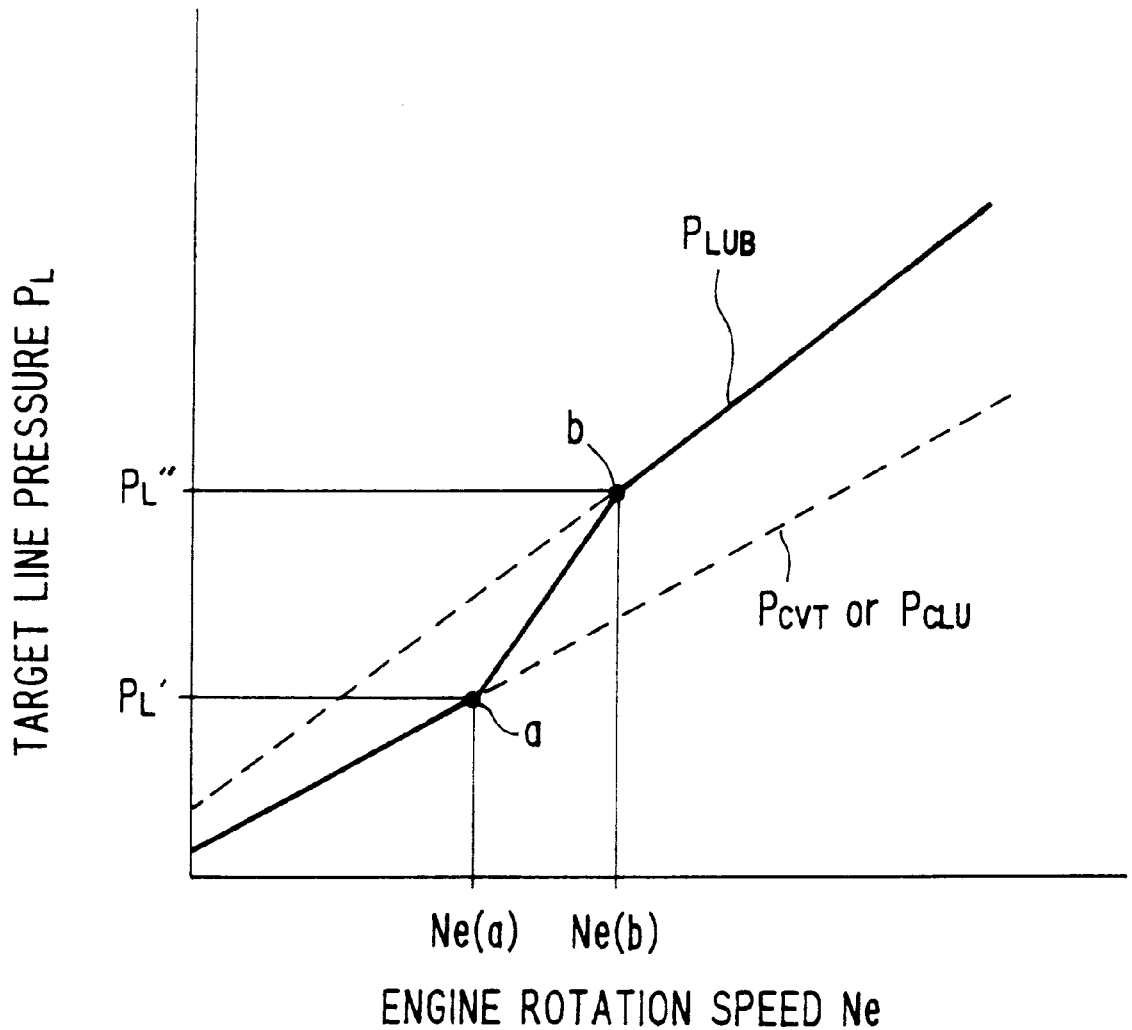
FIG. 8 is a figure showing the relationship between engine rotation speed and the target line pressure of the transmission.

The required pressure $P_L(e)$ varies gradually from $P_L'$ to $P_L''$ as shown in FIG. 8 because the required pressure $P_L(e)$ is calculated by linear interpolation using the two thresholds Ne(a) and Ne(b). Thus, it is possible to prevent the line pressure from varying in a stepwise manner and prevent the pump noise characteristics from varying quickly.

It is possible to switch the calculation method of the required pressure $P_L(e)$ using one of the thresholds. The threshold is set for example 2000 rpm. In this case, it is also possible to maintain both required oil pressure and to suppress pump noise.

However in this case, as the method of calculating the required pressure $P_L(e)$ differs on either side of the threshold, if the calculated required pressure $P_L(e)$ is different on either side of the threshold, the target line pressure $P_L$ varies in a stepwise manner.

When the required pressure $P_L(e)$, calculated in the above manner, is set to the target line pressure $P_L$ in a step S111 which will be discussed below with reference to FIG. 4, the controller 61 drives the line pressure solenoid 215 at a corresponding duty ratio.

When the engine rotation speed is low, the calorific value of the constituent member of the variable mechanism 203 for example the power rollers 3 decreases. Thus, the oil pressure which is actually required for lubrication becomes lower than the lubrication pressure $P_{LUB}$. According to the above calculation process, when the engine rotation is low, the lubrication pressure $P_{LUB}$ is not considered in setting the line pressure. As a result, the noise of the oil pump can be reduced.

When the above calculation process is adapted to an automatic transmission using a planetary gear, the CVT pressure does not exist. Therefore when the engine rotation speed is high, the required pressure may be set to the higher of lubrication pressure and clutch pressure. When the engine rotation speed is low, the lubrication pressure may be ignored and the clutch pressure may be set as the required pressure. When there are a plurality of clutch pressures the highest one is used. The lubrication pressure and clutch pressure may be calculated in the same way as equations (1) and (3). Two thresholds are used as in the case of CVT above when it is determined whether the engine rotation speed is low.

When the engine rotation speed is between the two thresholds, the required pressure $P_L(e)$ is calculated by linear interpolation so that the target line pressure does not vary in a stepwise manner and thus rapid variation in pump noise characteristics may be prevented.

Returning to FIG. 4, in a step S101, it is determined whether the vehicle speed VSP is higher than a fixed vehicle speed VSP1 The fixed vehicle speed VSP1 may be set to a speed between 100 km/hr–120 km/hr, preferably between 105 km/hr–115 km/hr. If the vehicle speed VSP is higher than the fixed vehicle speed VSP1, the routine proceeds to a step S102.

In the step S102, a throttle opening TVO and a fixed low opening TVOc are compared and it is determined whether or not the throttle opening TVO is close to a value of zero or not. TVOC may be set to a value between 0/8–1/8, preferably set to 0/8.

If the vehicle speed VSP is higher than the fixed vehicle speed VSP1 and the engine throttle opening TVO is not near a value of zero, the routine proceeds to a step S103.

In the step S103, the required pressure $P_L(e)$ which is calculated in the step S100 is compared with a fixed high line pressure $P_{LH}$. When $P_{LH}$ is higher than the required pressure $P_L(e)$, the routine proceeds to a step S110 and $P_{LH}$ is set as the target line pressure $P_L$.

Figure 10:
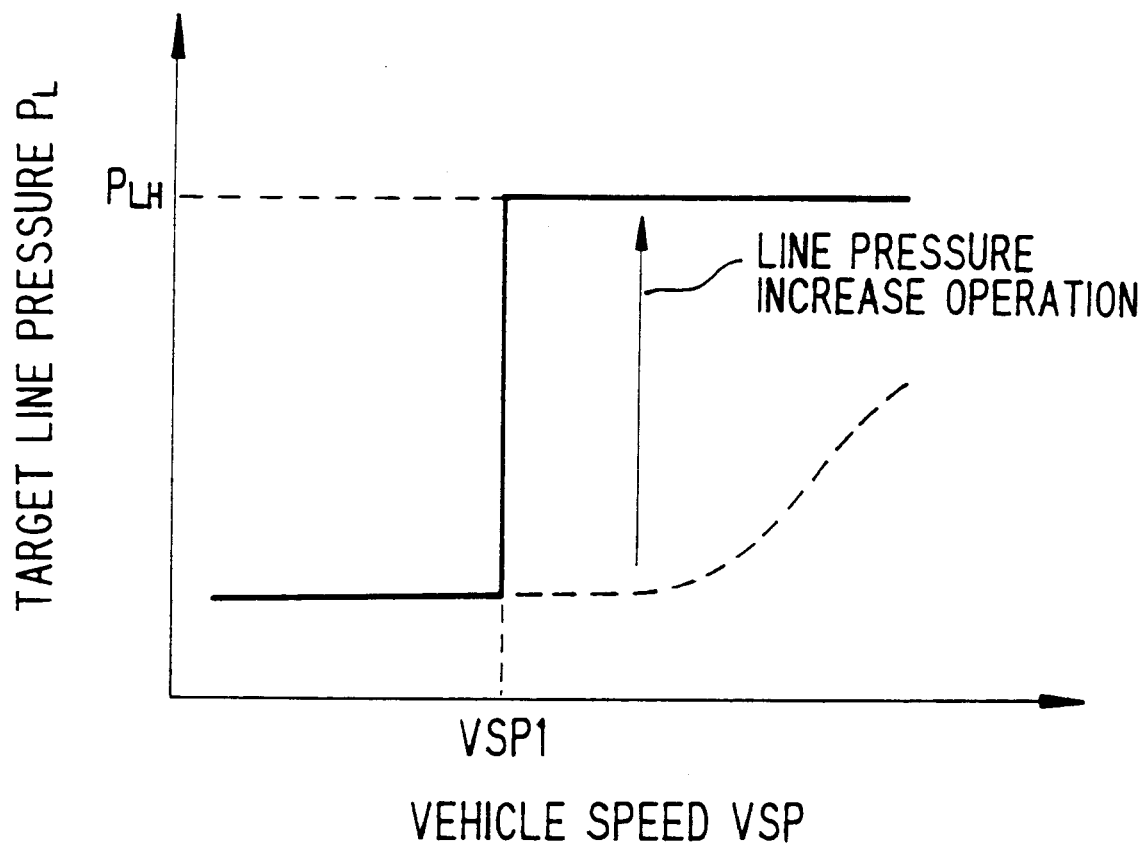
FIG. 10 shows the relationship between vehicle speed and target line pressure.

When the target line pressure $P_L$ is set to the fixed high line pressure $P_{LH}$ and the line pressure solenoid 215 is driven at a corresponding duty ratio, the line pressure rises as shown in FIG. 10 (hereafter line pressure increase operation).

If the line pressure increase operation is not preformed and the line pressure is set depending on input torque during high speed running conditions, when the throttle opening is small and the input torque is small, the line pressure is set to a small value even during high speed running. When the vehicle is running at a high speed, the constituent member of the speed ratio varying mechanism 203, for example, the power rollers 3 rotate at a high speed. Thus, it is necessary to increase the amount of lubrication oil irrespective of the input torque.

In the present embodiment, when vehicle speed is higher than the fixed vehicle speed VSP1, the target line pressure $P_L$ rises to the fixed high line pressure $P_{LH}$ irrespective of the input torque as shown by the solid line in FIG. 10. In this way, it is possible to prevent deficiencies in lubrication oil amount during high speed running. The line pressure may rise rapidly, but a shock as when the select range shifts from N range to D range is not generated when the vehicle is running.

If the vehicle speed VSP is not larger than VSP1 or the throttle opening TVO is smaller than TVOc or the required pressure $P_L(e)$ is larger than $P_{LH}$, the routine proceeds to a step S111.

In the step S111, one of the three procedures [1]–[3] outlined below are performed depending on the vehicle speed VSP and throttle opening TVO to set the target line pressure $P_L$.

Figure 9:
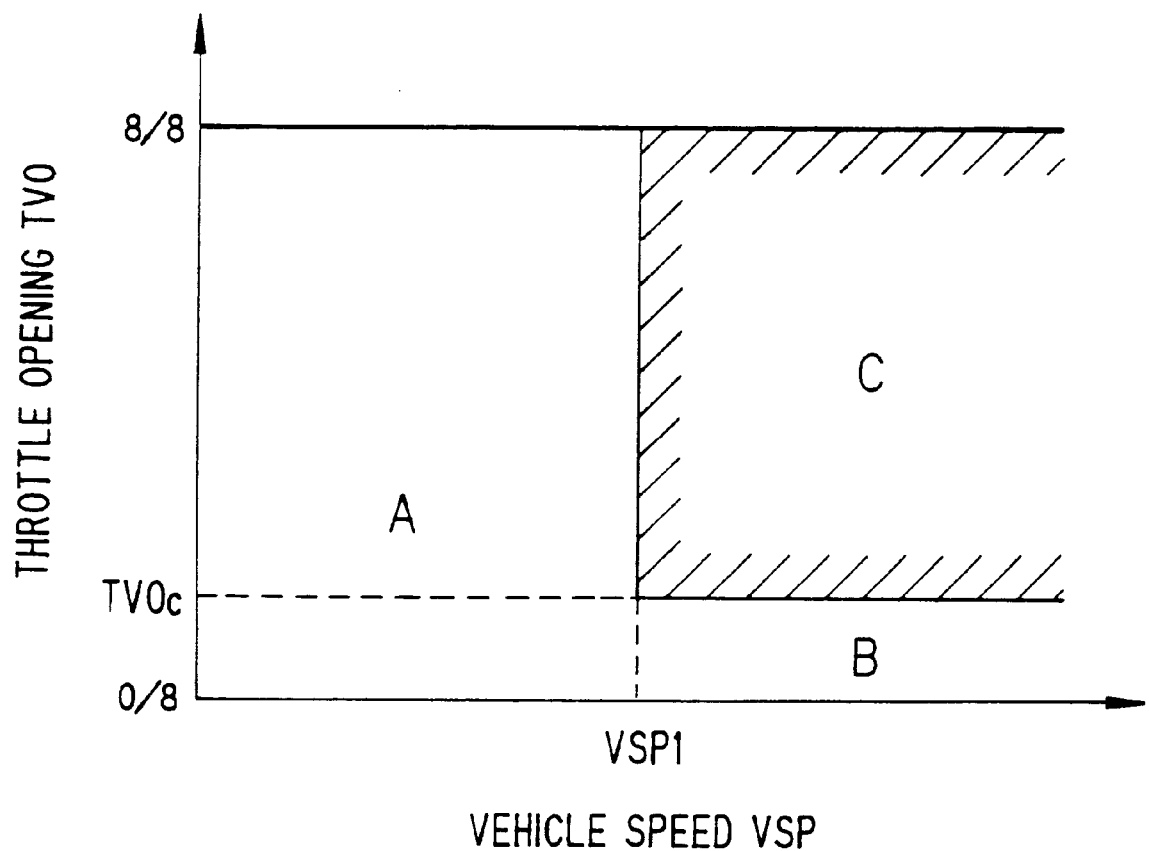
FIG. 9 is a map for switching the method of setting line pressure in response to throttle opening and vehicle speed.

[1] When the vehicle speed VSP is lower than VSP1 (region A in FIG. 9)

The required pressure $P_L(e)$ calculated on the basis of the lubrication pressure $P_{LUB}$ CVT pressure $P_{CVT}$ and clutch pressure $P_{CLU}$ in the step S100 is set to the target line pressure $P_L$. Since the method of calculating the required pressure $P_L(e)$ is switched according to the engine rotation speed as mentioned above, both the reduction in pump noise and the required oil pressure for the transmission 200 can be achieved.

[2] When the vehicle speed VSP is higher than VSP1 and the throttle opening TVO is smaller than TVOc (region B in FIG. 9)

In the region B, in order to increase an engine brake, the speed ratio is changed to a larger value when the throttle opening TVO becomes zero. This is called automatic engine brake control and is disclosed in Tokkai Hei 9-112671 published by the Japanese Patent Office in 1997. If the line pressure is high when the automatic engine brake control is performed, the speed ratio may change to a larger value suddenly.

In order to prevent the sudden change of the speed ratio while coasting, in this region, the line pressure is decreased.

[3] When the vehicle speed VSP is higher than VSP1 and the throttle opening TVO is larger than TVOC (region C in FIG. 9)

In this region C, the target line pressure $P_L$ is normally set to the high line pressure $P_{LH}$. However, when the required pressure $P_L(e)$ which is greater than $P_{LH}$ is calculated in the step S100, the required pressure $P_L(e)$ is set to the target line pressure $P_L$.

The entire contents of Japanese Patent Applications P10-209826 (filed Jul. 24, 1998) and P10-212662 (filed Jul. 28, 1998) are incorporated herein by reference.

Although the invention has been described above by reference to certain embodiments of the invention, the invention is not limited to the embodiments described above. For example, the present invention may be adapted in the same way to a line pressure control device for a V-belt CVT or an automatic transmission using a planetary gear. Modifications and variations of the embodiments described above will occur to those skilled in the art, in light of the above teachings.

The scope of the invention is defined with reference to the following claims.

What is claimed:

1. A line pressure control device for an automatic transmission, said transmission comprising a speed ratio varying mechanism and a clutch mechanism for transmitting a rotation of an engine to an output shaft, said line pressure control device comprising:

an oil pressure circuit for varying a line pressure supplied to said speed ratio varying mechanism and said clutch mechanism, a sensor for detecting a rotation speed of said engine, and a microprocessor programmed to calculate a lubrication pressure for lubrication of said speed ratio varying mechanism and a clutch pressure for an operation of said clutch mechanism based on an operating condition of said transmission, determine whether said rotation speed of said engine is higher or lower than a fixed threshold, set a target line pressure to the higher of said lubrication pressure and said clutch pressure as a target line pressure, when said rotation speed of said engine is higher than said threshold, set said clutch pressure as said target line pressure when said rotation speed of said engine is lower than said threshold and control said oil pressure circuit so that said line pressure equals said target line pressure.

2. A line pressure control device according to claim 1 wherein said microprocessor is further programmed to calculate a CVT pressure for an operation of said speed ratio varying mechanism based on said operating condition of said transmission, set the highest of said lubrication pressure, said clutch pressure and said CVT pressure as said target line pressure when said rotation speed of said engine is higher than said threshold and set the higher of said clutch pressure and said CVT pressure as said target line pressure when said rotation speed of said engine is lower than said threshold.

3. A line pressure control device for an automatic transmission, said transmission comprising a speed ratio varying mechanism and a clutch mechanism for transmitting a rotation of an engine to an output shaft, said line pressure control device comprising:

an oil pressure circuit for varying a line pressure supplied to said speed ratio varying mechanism and said clutch mechanism, a sensor for detecting a rotation speed of said engine, and a microprocessor programmed to calculate a lubrication pressure for lubrication of said speed ratio varying mechanism and a clutch pressure for an operation of said clutch mechanism based on an operating condition of said transmission, compare said rotation speed of said engine with a first threshold, compare said rotation speed of said engine with a second threshold which is larger than said first threshold, set the higher of said lubrication pressure and said clutch pressure as a target line pressure, when said rotation speed of said engine is higher than said second threshold, set said clutch pressure as said target line pressure when said rotation speed of said engine is lower than said first threshold, set said target line pressure so that line pressure gradually varies from a target line pressure set when said rotation speed of said engine is said first threshold to a target line pressure set when said rotation speed of said engine is said second threshold, when said rotation speed of said engine is between said first and second threshold and control said oil pressure circuit so that said line pressure equals said target line pressure.

4. A line pressure control device according to claim 3 wherein said microprocessor is further programmed to set said target line pressure by linear interpolation using a target line pressure set when said rotation speed of said engine is said first threshold and a target line pressure set when said rotation speed of said engine is said second threshold, when said rotation speed of said engine is between said first and second threshold.

5. A line pressure control device according to claim 1 further comprises a sensor for detecting a throttle opening of said engine and wherein said microprocessor is further programmed to calculate a torque input into said transmission based on said throttle opening and said rotation speed of said engine, and calculate either of said lubrication pressure and said clutch pressure depending on said input torque into said transmission.

6. A line pressure control device for an automatic transmission, said transmission comprising a speed ratio varying mechanism and a clutch mechanism for transmitting rotation of an engine to an output shaft, said line pressure control device comprising:

an oil pressure circuit for varying a line pressure supplied to said speed ratio varying mechanism and said clutch mechanism, means for detecting a rotation speed of said engine, means for calculating a lubrication pressure for lubrication of said speed ratio varying mechanism and a clutch pressure for an operation of said clutch mechanism based on an operating condition of said transmission, means for determining whether said rotation speed of said engine is higher or lower than a fixed threshold, means for setting a target line pressure to the higher of said lubrication pressure and said clutch pressure as a target line pressure, when said rotation speed of said engine is higher than said threshold, means for setting said clutch pressure as said target line pressure when said rotation speed of said engine is lower than said threshold and means for controlling said oil pressure circuit so that said line pressure equals said target line pressure.

* * * * *